(12) United States Patent
Pinera

(10) Patent No.: US 9,200,597 B1
(45) Date of Patent: Dec. 1, 2015

(54) EXTENDABLE NOZZLE FOR ROCKET ENGINE

(75) Inventor: Alex Pinera, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 802 days.

(21) Appl. No.: 13/572,809

(22) Filed: Aug. 13, 2012

Related U.S. Application Data

(60) Provisional application No. 61/668,906, filed on Jul. 6, 2012.

(51) Int. Cl.
   *F02K 9/97* (2006.01)
   *F02K 9/80* (2006.01)

(52) U.S. Cl.
   CPC .. *F02K 9/976* (2013.01); *F02K 9/80* (2013.01)

(58) Field of Classification Search
   CPC ............. F02K 1/08; F02K 9/97; F02K 9/976; F02K 9/84; F02K 9/80

USPC ............... 60/200.1, 771; 239/265.11, 265.19, 239/265.43

See application file for complete search history.

(56) References Cited

U.S. PATENT DOCUMENTS

| | | | | |
|---|---|---|---|---|
| 3,270,504 A | * | 9/1966 | Ward | 239/265.33 |
| 3,561,679 A | * | 2/1971 | Lager | 239/265.11 |
| 3,711,027 A | * | 1/1973 | Carey | 239/265.19 |
| 7,571,610 B2 | * | 8/2009 | Kretschmer | 60/771 |

* cited by examiner

*Primary Examiner* — Gerald L Sung
(74) *Attorney, Agent, or Firm* — John Ryznic

(57) ABSTRACT

An extendable nozzle for a rocket engine includes a chamber with a main combustion chamber and a throat and a main nozzle formed within a guide tube, where a nozzle extension slides over the guide tube from a stowed position to an extendable position. A locking O-ring secures the nozzle extension in a stowed position, and a locking split ring holds the nozzle extension in the extended position.

13 Claims, 6 Drawing Sheets

EXTENDABLE NOZZLE FOR ROCKET ENGINE

CROSS-REFERENCE TO RELATED APPLICATIONS

This application claims the benefit to U.S. Provisional Application 61/668,906 filed on Jul. 6, 2012 and entitled EXTENDABLE NOZZLE FOR ROCKET ENGINE.

GOVERNMENT LICENSE RIGHTS

None.

BACKGROUND OF THE INVENTION

Field of the Invention

The present invention relates generally to a rocket engine, and more specifically to an extendable nozzle for a rocket engine.

Description of the Related Art including information disclosed under 37 CFR 1.97 and 1.98

Nozzles are an integral part of any rocket engine as they direct the thrust and, thus, the motion of the rocket. Extendable nozzles are significant because they increase the efficiency of the rocket in vacuum pressure by increasing the exit area ratio. Benefits of an extendable nozzle include the ability to stow the extended portion in order to reduce overall length (OAL) before engagement. With the application of Divert and Attitude Control System (DACS) thrusters, small nozzles are needed to fit in the nosecone of the vehicle. However, a thruster that can fit in this small space will be inefficient as the exit area ratio will be very low; or the engine will need to have a high chamber pressure to maintain a high area ratio for a low OAL. An extendable nozzle can be used instead to satisfy the space requirements of the nosecone. Once the vehicle is in space, the nozzle extension will actuate and increase the available specific impulse of the system.

There are essentially two primary methods for nozzle extensions: active or passive. The active systems (e.g., the RL10A-4) require elaborate actuation mechanisms like motors, belts, ball screws, etc. The passive systems (e.g. the convoluted nozzle of U.S. Pat. No. 3,711,027) all require some type of flexible or ductile material for the extension. An active system is not desirable for a DACS thruster because it will add a significant amount of weight and will reduce reliability a great deal. The flexible materials required for the passive system also limit the material selection for the nozzle extensions. Most, if not all, DACS thruster nozzles are uncooled and require the use of refractory alloys or carbon composite materials. Plastically deforming refractory alloys pose many difficulties (such as coating integrity, structural integrity, force required to deform, etc.) and plastically deforming carbon composite is impossible.

BRIEF SUMMARY OF THE INVENTION

The present invention consists of a passive extendable nozzle for small thrusters. The extendable nozzle section of the thruster is stowed over the main combustion chamber using a guide tube. The extendable nozzle section is locked in the stowed position for the ascent stage. When ready to be deployed, an inert gas or combustion products are introduced in the main combustion chamber where the nozzle builds pressure due to a cap on its exit. The pressure provides a force to actuate the nozzle and the nozzle locks into position at the full end of its travel by a locking ring. At this point the pressure cap on the end of the nozzle blows out and the thruster is ready to operate.

DETAILED DESCRIPTION OF THE INVENTION

Figure 1:
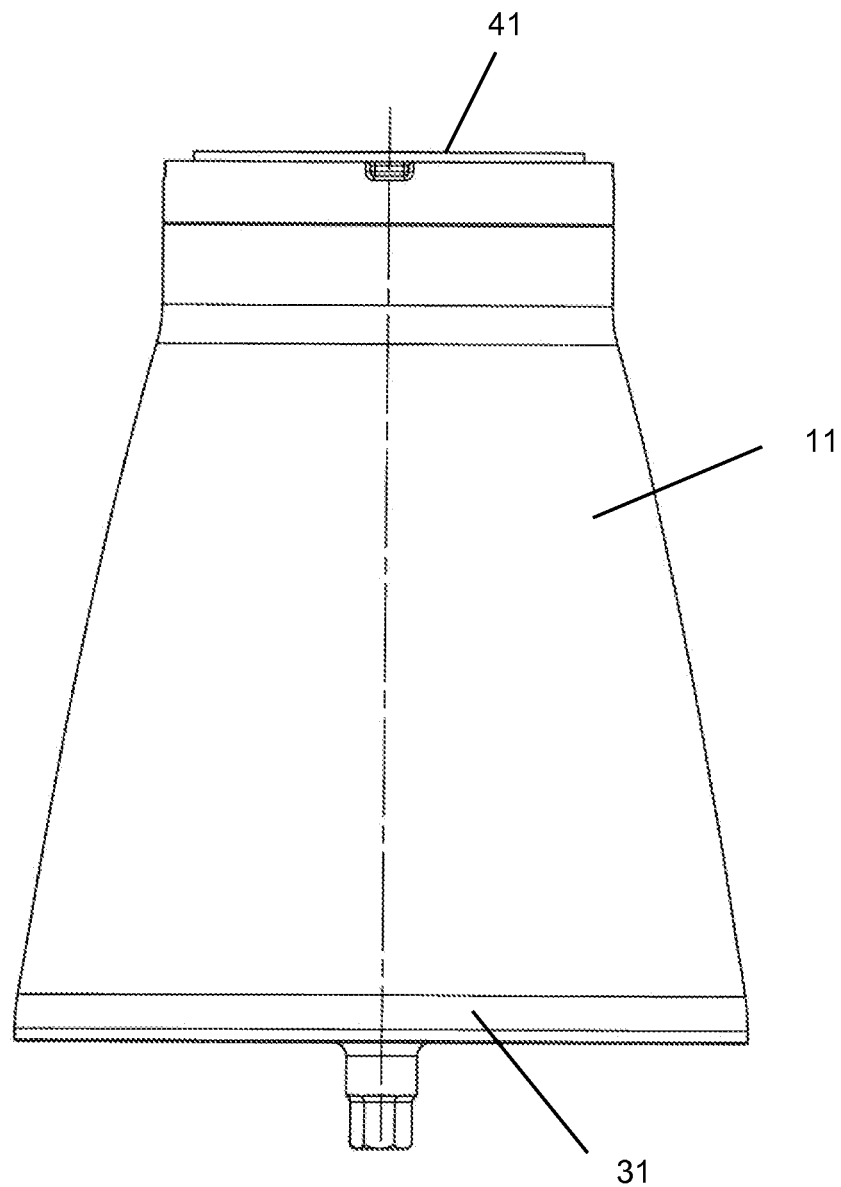
FIG. 1 shows a side view of the nozzle extension of the present invention in a stowed position.
Figure 2:
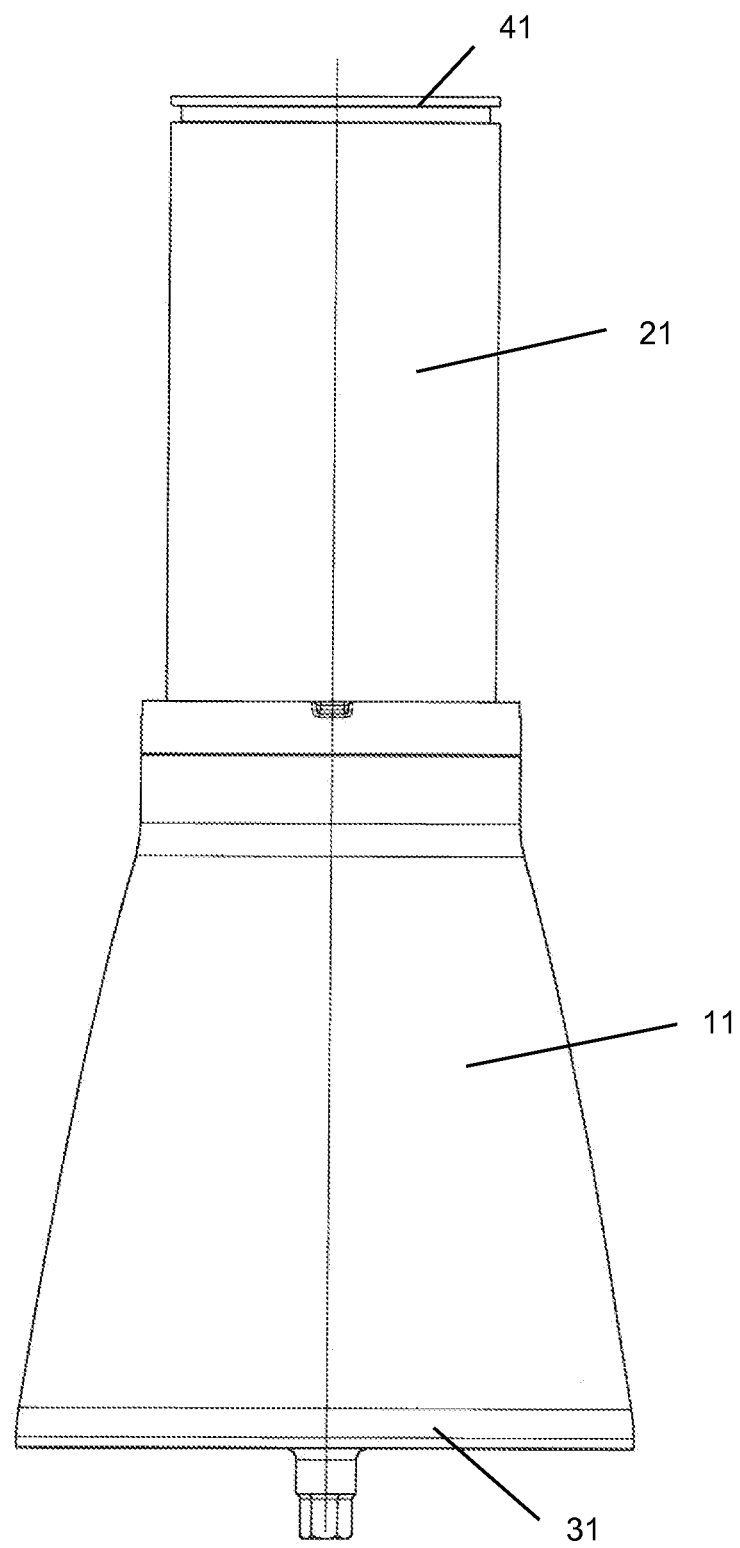
FIG. 2 shows a side view of the nozzle extension of the present invention in an extended position.

FIG. 1 shows the extendable nozzle in the stowed position. FIG. 2 shows the extendable nozzle in an extended position. The extendable nozzle includes a nozzle extension 11 that slides axially over a guide tube 21. A pressure cap or burst disk 31 encloses the outlet open end of the nozzle extension 11.

Figure 3:
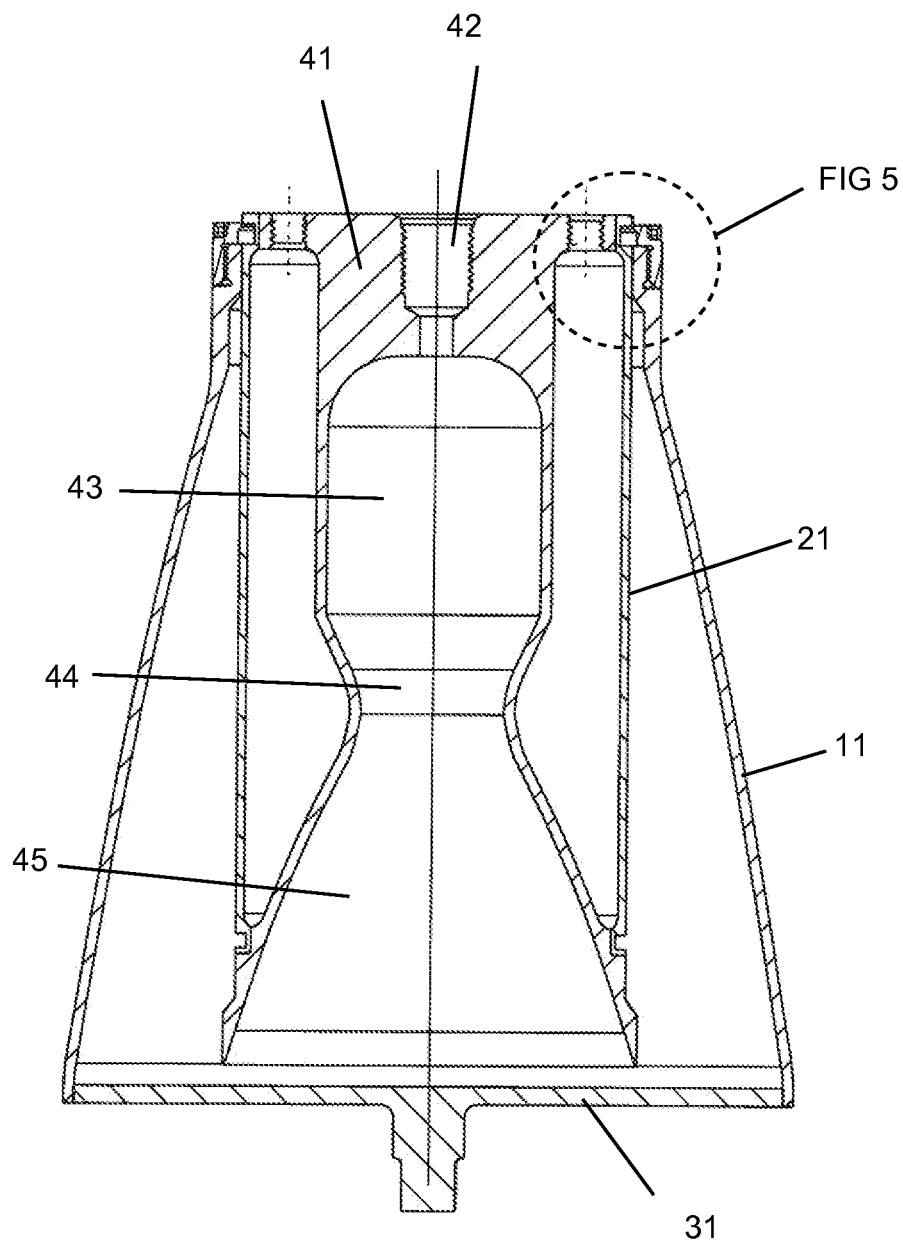
FIG. 3 shows a cross section side view of the nozzle extension of the present invention in the stowed position.

FIG. 3 shows a cross section view of the extendable nozzle in the stowed position. The extendable nozzle 11 slides axially over the guide tube 21 which are attached to a chamber 41. The chamber 41 includes a main injector inlet 42, a main combustion chamber 43, a throat 44 and a nozzle 45.

Figure 4:
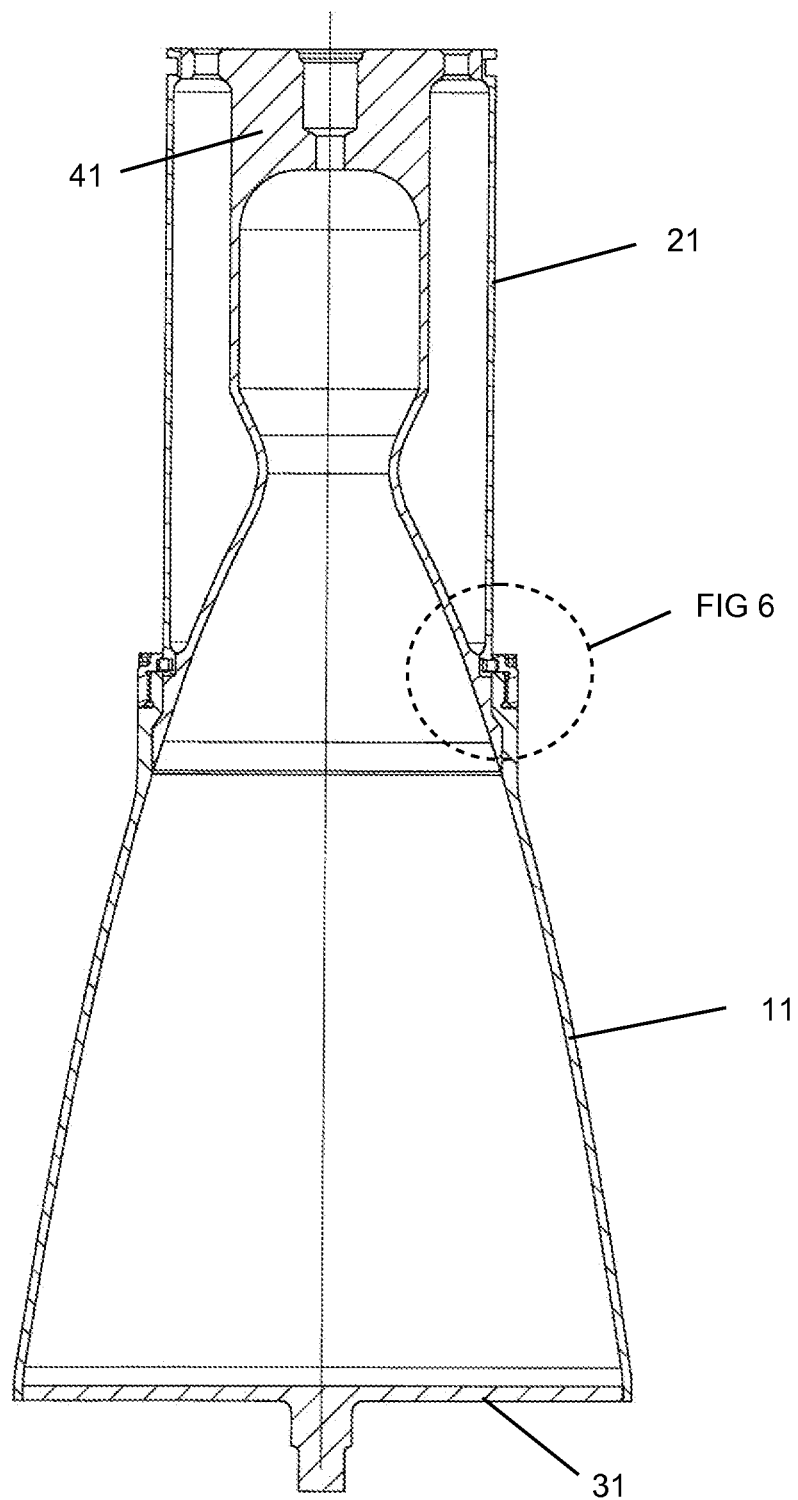
FIG. 4 shows a cross section side view of the nozzle extension of the present invention in the extended position.
Figure 5:
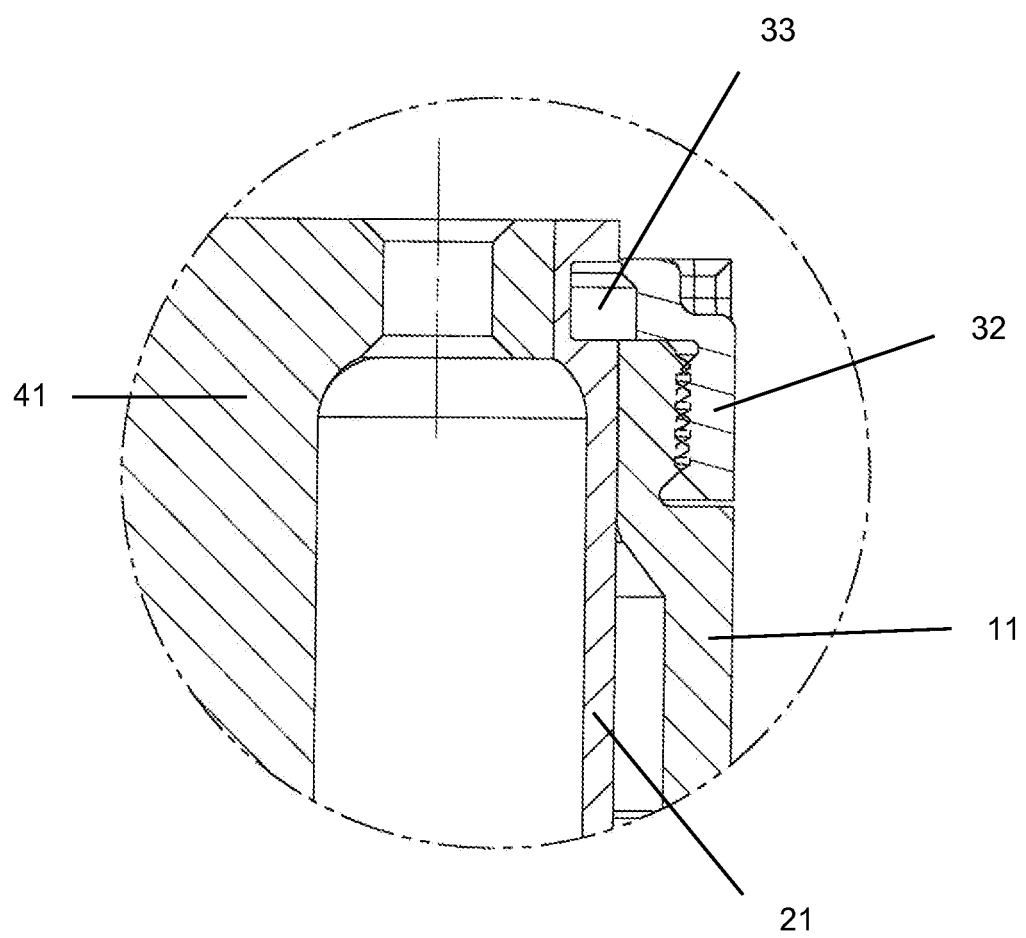
FIG. 5 shows a detailed cross section view of the stowed locking O-ring and assembly for the nozzle extension of the present invention.

FIG. 4 shows the extendable nozzle in the extended position with the pressure cap or burst disk 31 still on. FIG. 5 shows a detailed view of the connection between the guide tube 21 and the nozzle extension 11 in the stowed position. A stowed locking O-ring 33 is located within an annular groove of the upper end of the guide tube 21 to secure the nozzle extension 11 during the ascent phase of the launch. The locking O-ring 33 is made out of an elastomer or a flexible metallic that can be crushed when the nozzle is ready to be deployed. The locking O-ring 33 fits into a mating annular groove that is created by the nozzle extension 11 and a locking nut 32.

An extension locking nut 32 is threaded over the end of the nozzle extension 11 and holds the assembly together with the locking O-ring 33 set in annular grooves formed in both the guide tube 21 and the nozzle extension 11.

Figure 6:
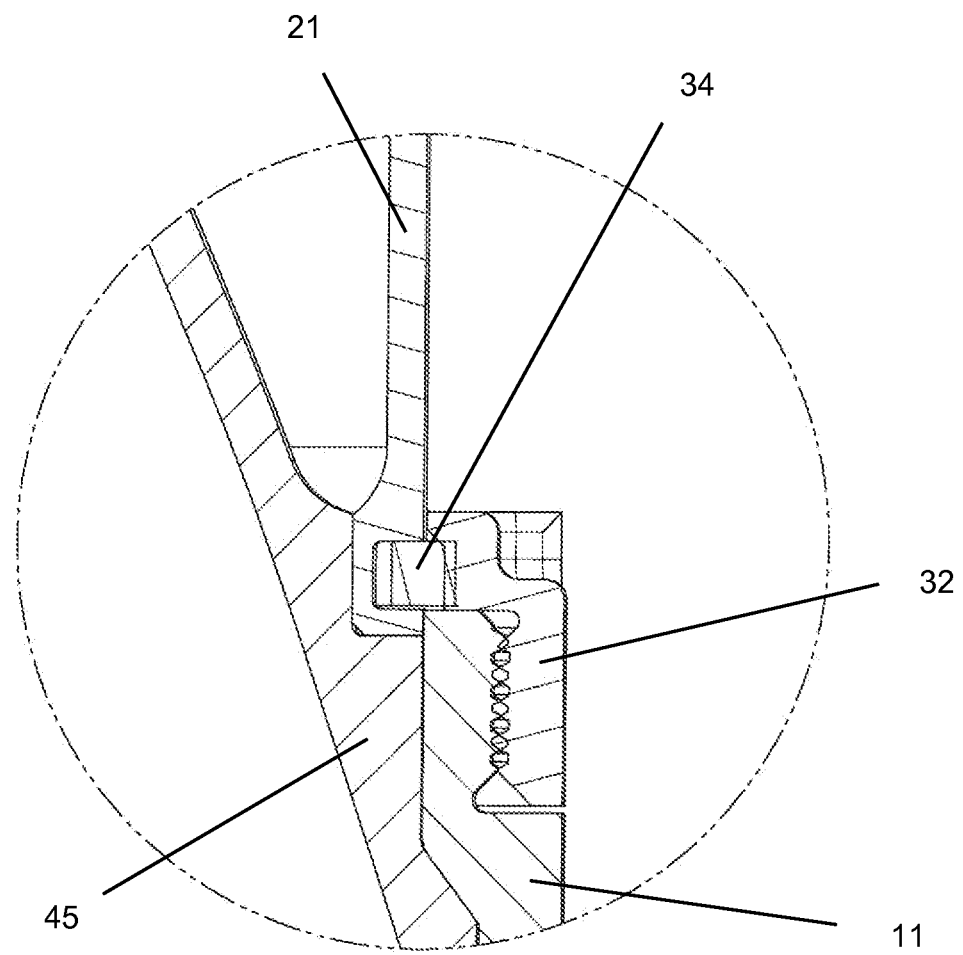
FIG. 6 shows a detailed cross section view of the locking ring and assembly for the nozzle extension of the present invention in the extended position.

FIG. 6 shows a detailed view of the connection between the guide tube 21 and the nozzle extension 11 in the extended position. A locking split ring 34 (different from the stowed locking O-ring 33) is secured in opposed annular grooves formed in both the lower end of the guide tube 21 and the upper end of the nozzle extension 11 to secure the assembly in the extended position. The locking split ring 34 is a split ring similar to a snap ring or piston ring. As the nozzle extension 11 slides over it, the locking split ring 34 compresses radially inward and when the nozzle extension groove (formed by the locking nut) slides over the locking ring, the locking split ring 34 springs radially outward, thus securing the nozzle extension 11 from riding back up the guide tube 21.

In the stowed position, the stowed locking O-ring 33 secures the nozzle extension 11 over the guide tube 21. In the extended position, the locking split ring 34 secures the nozzle extension 11 over the guide tube 21.

The extendable nozzle includes a number of features that make it simple and reliable without affecting performance or nozzle material selection. The main combustion chamber 43 is fully surrounded by a guide tube 21 that could also double as an insulator for surrounding systems during firing. The nozzle extension 11 surrounds the guide tube 21, which when deployed, lengthens the bell-shape of the main combustion chamber and increases the exit area ratio from 8.5 to 25 (Note: these values are customizable for many different area ratios). The nozzle extension 11 slides down the guide tube 21 to settle on a conical surface for proper alignment. The nozzle extension 11 is locked in place at two different positions on the guide tube 21. In the stowed position, there is an elastomeric locking O-ring 33 in a groove near the head end of the tube that produces an axial locking force against a corresponding groove in the extension piece.

When the nozzle is ready to be actuated, the Main Combustion Chamber (MCC) will be pressurized (either through initial inert gas or propellant), producing an axial force on a pressure cap 31, or burst disk, that entirely covers the exit area of the nozzle 11. The force overcomes the resistance of the stowed locking O-ring 33, pushing the nozzle extension 11 down the length of the guide tube 21. The nozzle extension 11 stops on the conical surface, at which point the nozzle is fully extended and operating with a 25:1 exit area ratio. When the nozzle is in this position, a locking split ring 34 springs out into the same groove where the stowed locking O-ring 33 had been. The locking split ring 34 creates a radial and axial force that will prevent the nozzle extension 11 from sliding back up the guide tube 21 and seals the exhaust gas as-well. FIG. 6 shows a detail view of the extended nozzle and locking mechanism. The locking split ring 34 is a split ring (or piston ring). As the nozzle moves over the locking split ring 34, the conical lead-in chamfer compresses the locking split ring 34 into the groove. Once the nozzle seats onto the conical face, the locking split ring 34 expands back to its free position into the groove on the nozzle extension 11. The nozzle is now locked and cannot ride back up the guide tube 21. The extension nut is used in order to be able to reset the locking split ring 34 during acceptance testing. More than one locking split ring 34 may be used to minimize leakage if deemed necessary. Additionally, thermal expansion of the Main Combustion Chamber vs. the Nozzle Extension 11 can be used to aid in sealing.

In one embodiment of the present invention, the nozzle that was built was approximately 6 inches long in the stowed position and 11 inches in the deployed position. The applicant was able to actuate the nozzle with various pressures starting from 5 psig to 20 psig. The nozzle extension 11 deployed every time. The higher the pressure the faster the deployment occurred. The nozzle extension 11 centered perfectly every time on the conical face and the pressure cap 31 blew out as soon as the nozzle extension 11 hit the conical face.

The nozzle extension of the present invention is superior to the prior art nozzle extensions for a few reasons. It does not require flexible materials, which allows for composite or coated refractory metal extendable nozzles. The entire system is very simple with few parts, all of which can be easily manufactured. The operation of the nozzle extension does not require any additional motors or actuators, making it more efficient and reliable. Actuation of the extension is entirely self-centering as it glides down the guide tube into the proper place.

I claim the following:
1. An extendable nozzle for a rocket engine comprising:
a guide tube;
a main combustion chamber and a throat and a main nozzle all contained within the guide tube;
a first annular groove formed on an upper end of the nozzle extension of the guide tube;
a second annular groove formed on a lower end of the guide tube;
a nozzle extension secured to and axially moveable over the guide tube;
the nozzle extension having a third annular groove formed on an upper end;
a locking O-ring secured in the first annular groove to engage with the third annular groove and secure the nozzle extension in a stowed position; and,
a locking split ring secured in the second annular groove to engage with the third annular groove to secure the nozzle extension in an extended position.

2. The extendable nozzle of claim 1, and further comprising:
a locking nut is threaded over the nozzle extension and forms part of the first annular groove to secure the locking O-ring.

3. The extendable nozzle of claim 1, and further comprising:
the locking O-ring is a destructible O-ring that is crushed to allow for the nozzle extension to break free from the stowed position.

4. The extendable nozzle of claim 1, and further comprising:
the locking O-ring is formed from an elastomeric or flexible material.

5. The extendable nozzle of claim 1, and further comprising:
the split locking ring is a radial compressible ring.

6. The extendable nozzle of claim 1, and further comprising:
the guide tube is cylindrical shaped.

7. The extendable nozzle of claim 1, and further comprising:
a burst disk is secured to an open end of the nozzle extension that can be removed from combustion gas discharging from the main nozzle when the nozzle extension is locked in an extended position.

8. The extendable nozzle of claim 1, and further comprising:
a chamber with the main combustion chamber and the throat and the main nozzle includes the guide tube formed outside of the chamber; and,
a main injector nozzle located in the chamber and opening into the main combustion chamber.

9. An extendable nozzle for a rocket engine comprising:
a guide tube;
a main combustion chamber and a throat and a main nozzle all contained within the guide tube;
a first annular groove formed on an upper end of the nozzle extension of the guide tube;
a second annular groove formed on a lower end of the guide tube;
a nozzle extension secured to and axially moveable over the guide tube;
the nozzle extension having a third annular groove formed on an upper end;
a first locking member secured in the first annular groove to engage with the third annular groove and secure the nozzle extension in a stowed position; and,
a second locking member secured in the second annular groove to engage with the third annular groove to secure the nozzle extension in an extended position.

10. The extendable nozzle of claim 9, and further comprising:
- the first locking member is a locking O-ring; and,
- the second locking member is a locking split ring.

11. The extendable nozzle of claim 9, and further comprising:
- a locking nut is threaded over the nozzle extension and forms part of the first annular groove to secure the first locking member.

12. The extendable nozzle of claim 9, and further comprising:
- the first locking member is a destructible locking O-ring that is crushed to allow for the nozzle extension to break free from the stowed position.

13. The extendable nozzle of claim 9, and further comprising:
- the first locking member is a locking O-ring formed from an elastomeric or flexible material.

\* \* \* \* \*